US 011029650B2

(12) United States Patent
Tsuneki et al.

(10) Patent No.: US 11,029,650 B2
(45) Date of Patent: Jun. 8, 2021

(54) MACHINE LEARNING DEVICE, CONTROL SYSTEM, AND MACHINE LEARNING METHOD

(71) Applicant: FANUC CORPORATION, Yamanashi (JP)

(72) Inventors: Ryoutarou Tsuneki, Yamanashi (JP); Satoshi Ikai, Yamanashi (JP); Takaki Shimoda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/510,027

(22) Filed: Jul. 12, 2019

(65) Prior Publication Data

US 2020/0073343 A1 Mar. 5, 2020

(30) Foreign Application Priority Data

Aug. 30, 2018 (JP) .............................. JP2018-161751

(51) Int. Cl.
*G05B 13/02* (2006.01)
*G05B 19/19* (2006.01)
(52) U.S. Cl.
CPC ......... *G05B 13/0265* (2013.01); *G05B 19/19* (2013.01); *G05B 2219/33034* (2013.01)
(58) Field of Classification Search
CPC ................ G05B 13/0265; G05B 19/19; G05B 2219/33034; G05B 2219/41232
See application file for complete search history.

(56) References Cited

U.S. PATENT DOCUMENTS

| 5,404,418 A * | 4/1995 | Nagano | G05B 19/19 388/806 |
| 6,137,886 A * | 10/2000 | Shoureshi | F16F 15/002 381/71.2 |
| 9,024,566 B2 * | 5/2015 | Ikeda | G05B 11/42 318/609 |
| 2002/0117579 A1 * | 8/2002 | Kotoulas | F16F 15/02 244/1 N |
| 2003/0158709 A1 * | 8/2003 | Ishida | G05B 13/0285 702/189 |
| 2015/0355628 A1 * | 12/2015 | Sonoda | G05B 19/404 318/632 |

FOREIGN PATENT DOCUMENTS

| JP | 5-19858 | 1/1993 |
| JP | 2009-104439 | 5/2009 |
| JP | 2015-230617 | 12/2015 |
| WO | 2018/151215 | 8/2018 |

* cited by examiner

*Primary Examiner* — Bickey Dhakal
(74) *Attorney, Agent, or Firm* — Wenderoth, Lind & Ponack, L.L.P.

(57) ABSTRACT

Setting of parameters that determine filter characteristics is facilitated. Machine learning of optimizing the coefficients of a filter provided in a motor control device that controls rotation of a motor for a machine tool, a robot, or an industrial machine is performed on the basis of measurement information of an external measuring instrument provided outside the motor control device and a control command input to the motor control device.

8 Claims, 8 Drawing Sheets

MACHINE LEARNING DEVICE, CONTROL SYSTEM, AND MACHINE LEARNING METHOD

This application is based on and claims the benefit of priority from Japanese Patent Application No. 2018-161751, filed on 30 Aug. 2018, the content of which is incorporated herein by reference.

BACKGROUND OF THE INVENTION

Field of the Invention

The present invention relates to a machine learning device that performs machine learning of optimizing coefficients of a filter provided in a motor control device that controls the rotation of a motor of a machine tool, a robot, or an industrial machine and relates to a control system including the machine learning device and a machine learning method.

Related Art

A device that automatically adjusts characteristics of a filter is disclosed in Patent Document 1 and Patent Document 2, for example. Patent Document 1 discloses a servo actuator which superimposes an AC signal obtained by sweeping frequencies on a velocity command value signal during a tuning mode, detects an amplitude of a torque command value signal obtained from a velocity control unit as a result of the superimposition, and sets the frequency of the torque command value signal when the rate of change in the amplitude changes from positive to negative as a central frequency of a notch filter.

Patent Document 2 discloses a servo actuator which includes a velocity feedback loop that controls the velocity of a motor and in which a notch filter means is inserted in the velocity feedback loop to remove mechanical resonance, the servo actuator including: a data collection means that acquires data indicating the frequency response characteristics of the velocity feedback loop; a moving average means that calculates a moving average of the data acquired by the data collection means; a comparing means that compares the data obtained by the moving average means with the data obtained by the data collection means to extract the resonance characteristics of the velocity feedback loop; and a notch filter setting means that sets the frequency and the Q-value of the notch filter means on the basis of the resonance characteristics extracted by the comparing means.

Patent Document 1: Japanese Unexamined Patent Application, Publication No. H05-19858

Patent Document 2: Japanese Unexamined Patent Application, Publication No. 2009-104439

SUMMARY OF THE INVENTION

The servo actuator of Patent Document 1 adjusts the characteristics of the notch filter using the torque command value signal, and the servo actuator of Patent Document 2 adjusts the characteristics of the notch filter on the basis of the frequency response characteristics of the velocity feedback loop. However, when the characteristics of the notch filter are determined, it is necessary to determine a plurality of parameters such as a central frequency and a bandwidth of a band to be removed, and it is not easy to calculate the optimal values thereof.

In the servo actuator of Patent Document 1, the means that superimposes the AC signal obtained by sweeping frequencies with the velocity command value signal and the means that detects the amplitude of the torque command value signal obtained from the velocity control unit as the result of the superimposition need to be provided separately from a servo control circuit, and a circuit configuration becomes complex. In the servo actuator of Patent Document 2, the data collection means that acquires data indicating the frequency response characteristics of the velocity feedback loop, the moving average means that calculates moving average of the data acquired by the data collection means, and the comparing means that compares the data obtained by the moving average means and the data obtained by the data collection means to extract the resonance characteristics of the velocity feedback loop need to be provided separately from a servo control circuit, and a circuit configuration becomes complex.

An object of the present invention is to provide a machine learning device capable of facilitating the setting of parameters that determine the characteristics of a detaching an external measuring instrument after machine learning is performed, reducing costs, and improving reliability and to provide a control system including the machine learning device and a machine learning method.

(1) A machine learning device according to the present invention is a machine learning device (for example, a machine learning unit 130 to be described later) that performs machine learning of optimizing coefficients of a filter (for example, a filter 110 to be described later) provided in a motor control device (for example, a motor control device 100 to be described later) that controls the rotation of a motor (for example, a servo motor 127 to be described later) on the basis of measurement information of an external measuring instrument (for example, an acceleration sensor 300 to be described later) provided outside the motor control device and a control command input to the motor control device.

(2) In the machine learning device according to (1), the measurement information of the external measuring instrument may include at least one of a position, a velocity, and an acceleration.

(3) in the machine learning device according to (1) or (2), the motor control device may include at least one of a position feedback loop and a velocity feedback loop, and the filter may be provided outside the position feedback loop or the velocity feedback loop.

(4) In the machine learning device according to (1) or (2), the motor control device may have a feedback loop, and the measurement information of the external measuring instrument may not be used for feedback control of the feedback loop.

(5) In the machine learning device according to any one of (1) to (4), the external measuring instrument may be detached after adjustment of the filter by machine learning.

(6) The machine learning device according to any one of (1) to (5) may further include: a state information acquisition unit (for example, a state information acquisition unit 131 to be described later) that acquires state information including the measurement information, the control command, and the coefficients of the filter; an action information output unit (for example, an action information output unit 133 to be described later) that outputs action information including adjustment information of the coefficients included in the state information to the filter; a reward output unit (for example, a reward output unit 1321 to be described later) that outputs a reward value of reinforcement learning using a value function based on a difference between the measurement information and the control command; and a value function updating unit (for example, a value function updating unit 1322 to be described later) that updates an action value function on the basis of the reward value output by the reward output unit, the state information, and the action information.

(7) The machine learning device according to (6) may further include: an optimization action information output unit (for example, an optimization action information output unit 135 to be described later) that outputs adjustment information of the coefficients on the basis of the value function updated by the value function updating unit.

(8) A control system according to the present invention is a control system including: a motor control device (for example, a motor control device 100 to be described later) that includes the machine learning device (for example, a machine learning unit 130 to be described later) according to any one of (1) to (7), a motor (for example, a servo motor 127 to be described later), and a filter (for example, a filter 110 to be described later) and controls the rotation of the motor; and an external measuring instrument (for example, an acceleration sensor 300 to be described later) provided outside the motor control device.

(9) A machine learning method according to the present invention is a machine learning method of a machine learning device that performs machine learning of optimizing coefficients of a filter provided in a motor control device that controls the rotation of a motor on the basis of measurement information of an external measuring instrument provided outside the motor control device and a control command input to the motor control device.

According to the present invention, it is easy to set the coefficients (parameters) that determine the characteristics of a filter. Moreover, since the external measuring instrument is disposed outside a motor control device, it is possible to detach the external measuring instrument after machine learning is performed, reducing costs and improving reliability.

DETAILED DESCRIPTION OF THE INVENTION

Hereinafter, an embodiment of the present invention will be described in detail with reference to the drawings.

Figure 1:
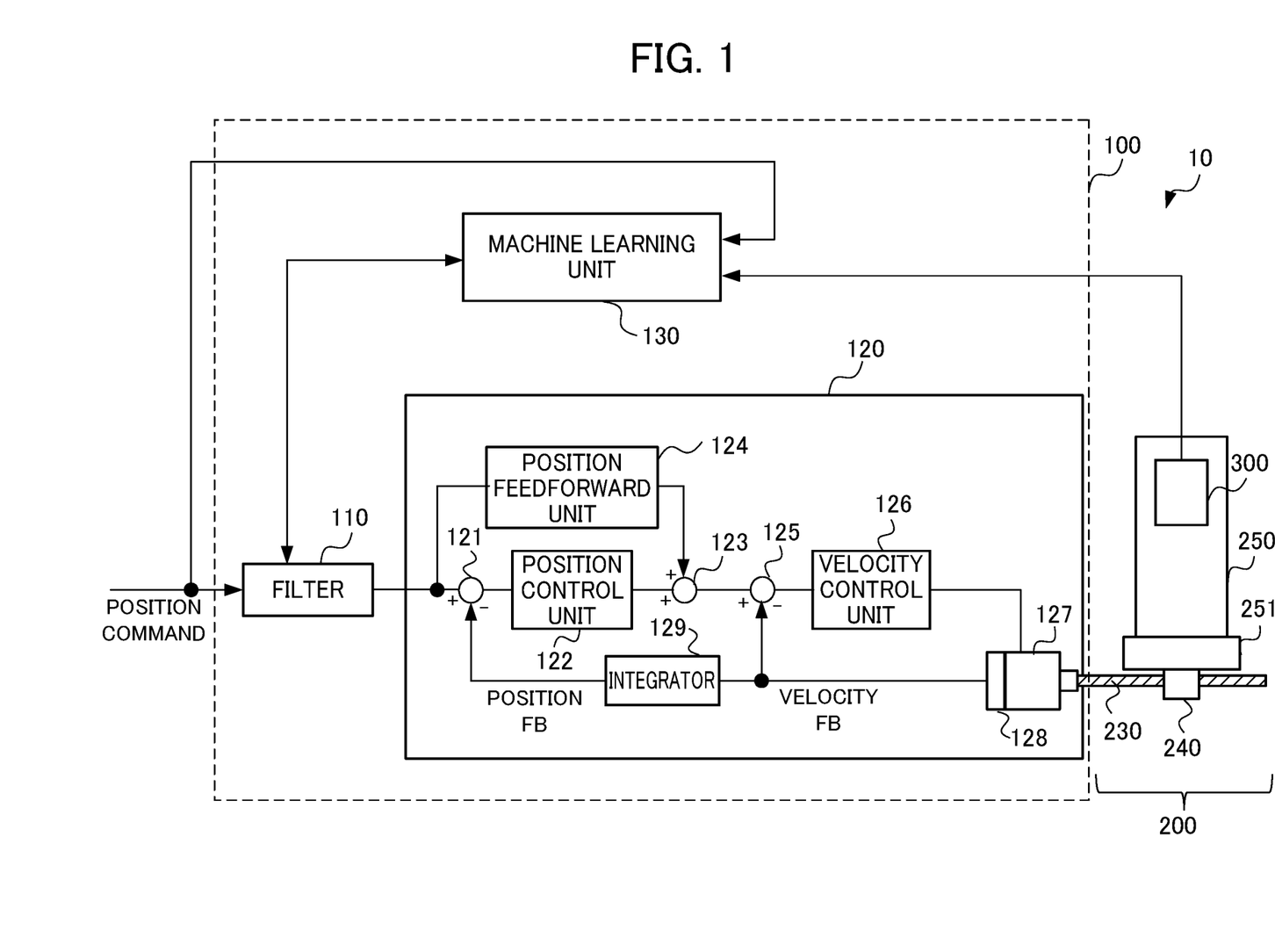
FIG. 1 is a block diagram illustrating a control system including a motor control device according to an embodiment of the present invention, a machine tool, and an acceleration sensor.

FIG. 1 is a block diagram illustrating a motor control device according to an embodiment of the present invention, a machine tool, and a control system including an acceleration sensor. As illustrated in FIG. 1, a control system 10 includes a motor control device 100, a machine tool 200 controlled by the motor control device 100, and an acceleration sensor 300 attached to the machine tool 200. The acceleration sensor 300 is an external measuring instrument provided outside the motor control device 100, and an acceleration measured is measurement information. Although a machine tool adopted and described as a control target of the motor control device 100, the control target is not limited to a machine tool and may be a robot, an industrial machine, or the like, for example. The motor control device 100 may be provided as a part of a control target such as a machine tool, a robot, or an industrial machine.

The motor control device 100 includes a filter 110, a servo control unit 120, and a machine learning unit 130. Although the motor control device 100 includes the servo control unit 120 that controls a servo motor in this example, the motor control device 100 may include a control unit that controls a spindle motor and does not perform feedback control. The filter 110 is a filter of the machine tool 200, and a notch filter, a filter that sets an acceleration or deceleration time constant, or an inverse characteristic filter, for example, is used. A position command is input to the filter 110, and the filter 110 serves as a position command value shaper that performs shaping of the input position command. The position command is generated by a host control device or an external input device according to a predetermined machining program so as to change a pulse frequency to change the velocity of a servo motor 127. The position command serves as a control command. Although the filter 110 is provided outside the servo control unit 120 (that is, outside a position feedback loop and a velocity feedback loop to be described later), the filter 110 may be provided inside a position feedback loop or a velocity feedback loop of the servo control unit 120. For example, the filter 110 may be connected to an output side of a velocity control unit 126 (to be described later) or an output side of an adder 123 of the servo control unit 120. However, in order to suppress vibration outside a control loop (a position feedback loop or a velocity feedback loop) of the servo control unit 120, the filter is preferably provided outside the position feedback loop or the velocity feedback loop. In FIG. 1, the filter 110 is disposed before a subtractor 121 (to be described later) that calculates a position error. Although a configuration of the filter 110 is not particularly limited, the filter is preferably an IIR filter of the second order or higher.

Expression 1 (indicated by Math. 1 below) indicates a transfer function $F(\rho, s)$ of a notch filter as the filter 110. The parameter $\rho$ indicates coefficients $\omega$, $\zeta$, and R. The coefficient R in Example 1 is an attenuation coefficient, the coefficient $\omega$ is a central angular frequency, and the coefficient $\zeta$ is a specific bandwidth. When the central frequency is fc and the bandwidth is fw, the coefficient $\omega$ is represented as $\omega = 2\pi fc$, and the coefficient $\zeta$ is represented as $\zeta = fw/fc$.

$$F(\rho, s) = \frac{s^2 + 2\zeta R\omega s + \omega^2}{s^2 + 2\zeta\omega s + \omega^2} \qquad \text{[Math. 1]}$$

The servo control unit 120 includes a subtractor 121, a position control unit 122, an adder 123, a position feedforward unit 124, a subtractor 125, a velocity control unit 126, a servo motor 127, a rotary encoder 128 serving as a position detection unit associated with the servo motor 127, and an integrator 129. The subtractor 121, the position control unit 122, the adder 123, the subtractor 125, the velocity control unit 126, the servo motor 127, the rotary encoder 128, and the integrator 129 form a position feedback loop. Moreover, the subtractor 125, the velocity control unit 126, the servo motor 127, and the rotary encoder 128 form a velocity feedback loop.

The subtractor 121 calculates a difference between a position command after shaping output from the filter 110 and a position-feedback detection position and outputs the difference to the position control unit 122 and the position feedforward unit 124 as a position error.

The position control unit 122 outputs a value obtained by multiplying the position error by a position gain Kp to the adder 123 as a velocity command value. The position feedforward unit 124 performs a position feedforward process represented by a transfer function G(s) indicated by Expression 2 (indicated by Math. 2 below) with respect to a value obtained by differentiating the position command value and multiplying the same by a constant α and outputs the processing result thereof to the adder 123 as a position feedforward term. The coefficients $a_i$ and $b_j$ (X≥i, j≥0, X is a natural number) in Expression 2 are the coefficients of the transfer function G(s).

$$G(s) = \frac{b_0 + b_1 s + b_2 s^2 + \ldots + b_x s^x}{a_0 + a_1 s + a_2 s^2 + \ldots + a_x s^x} \quad \text{[Math. 2]}$$

The adder 123 adds the velocity command value and an output value (a position feedforward term) of the position feedforward unit 124 and outputs an addition result to the subtractor 125 as a feedforward-controlled velocity command value. The subtractor 125 calculates a difference between the output of the adder 123 and the feedback velocity detection value and outputs the difference to the velocity control unit 126 as a velocity error.

The velocity control unit 126 adds a value obtained by multiplying and integrating the velocity error by an integral gain K1v and a value obtained by multiplying the velocity error by a proportional gain K2v and outputs an addition result to the servo motor 127 as a torque command.

A rotational angular position of the servo motor 127 is detected by the rotary encoder 128, and a velocity detection value is input to the subtractor 125 as a velocity feedback (a velocity FB). The velocity detection value is integrated by the integrator 129 to be a position detection value, and the position detection value is input to the subtractor 121 as a position feedback (a position FB). The servo control unit 120 is configured in this manner.

Next, prior to a description of the machine learning unit 130, the machine tool 200 and the acceleration sensor 300 attached to the machine tool 200 will be described. The machine tool 200 includes a ball screw 230 connected to a rotary axis of the servo motor 127, a nut 240 screwed into the ball screw 230, and a machine body 250 including a table 251 connected to the nut. With the rotation of the servo motor 127, the nut 240 screwed into the ball screw 230 moves in an axial direction of the ball screw 230.

In the machine tool 200, when the table 251 having a workpiece (a work) mounted thereon is moved in an X-axis direction and a Y-axis direction, the motor control device 100 illustrated in FIG. 1 is provided in the X-axis direction and the Y-axis direction, respectively. When the table is moved in the directions of three or more axes, the motor control device 100 is provided in the respective axial directions.

The acceleration sensor 300 is provided outside the servo control unit 120, and in this example, is attached to the machine body 250. The acceleration sensor serves as an external measuring instrument. Mono-axial, bi-axial, and tri-axial acceleration sensors are known as an acceleration sensor, and these acceleration sensors can be selected as necessary. For example, a bi-axial acceleration sensor is used when the table of the machine body 250 is moved in the X-axis direction and the Y-axis direction, and a tri-axial acceleration sensor is used when the table of the machine body 250 is moved in the X-axis direction, the Y-axis direction, and the Z-axis direction. The acceleration sensor 300 is preferably provided in a place near a machining point. The acceleration sensor 300 measures an acceleration of the machine body 250 and outputs the measured acceleration to the machine learning unit 130. When the acceleration sensor 300 is used during machine learning only, machine learning may be performed before shipment to adjust the coefficients of the filter 110, and the acceleration sensor 300 may be detached from the machine body 250 after the filter 110 is adjusted. When relearning is performed after shipment, the acceleration sensor may be detached after relearning is performed. Although the acceleration output from the acceleration sensor 300 may be used for feedback control of the servo control unit 120, the acceleration sensor 300 can be detached unless the acceleration is used for feedback control. In this case, it is possible to reduce the cost of the machine tool 200 and improve reliability.

<Machine Learning Unit 130>

The machine learning unit 130 executes a predetermined machining program (hereinafter also referred to as a "machining program during learning") and performs machine learning (hereinafter referred to as learning) on the coefficients ω, ζ, and R of the transfer function of the filter 110 using the position command and the acceleration measurement value from the acceleration sensor 300. The machine learning unit 130 serves as a machine learning device. Although the learning of the machine learning unit 130 is performed before shipment, relearning may be performed after shipment. Here, the motor control device 100 drives the servo motor 127 with the aid of the machining program during learning and moves the table 251 in a state in which a workpiece (a work) is not mounted. A moving trajectory of an arbitrary point of the table 251 moved in the X-axis direction and the Y-axis direction is circular, rectangular, octagonal, or a shape in which the corners of an octagon are alternately replaced with arcs. FIGS. 2 to 5 are diagrams for describing an operation of a motor when a moving trajectory of a table is circular, rectangular, octagonal, or a shape in which the corners of an octagon are alternately replaced with arcs. In FIGS. 2 to 5, it is assumed that the table 251 moves in a clockwise direction in the X-axis direction and the Y-axis direction.

Figure 2:
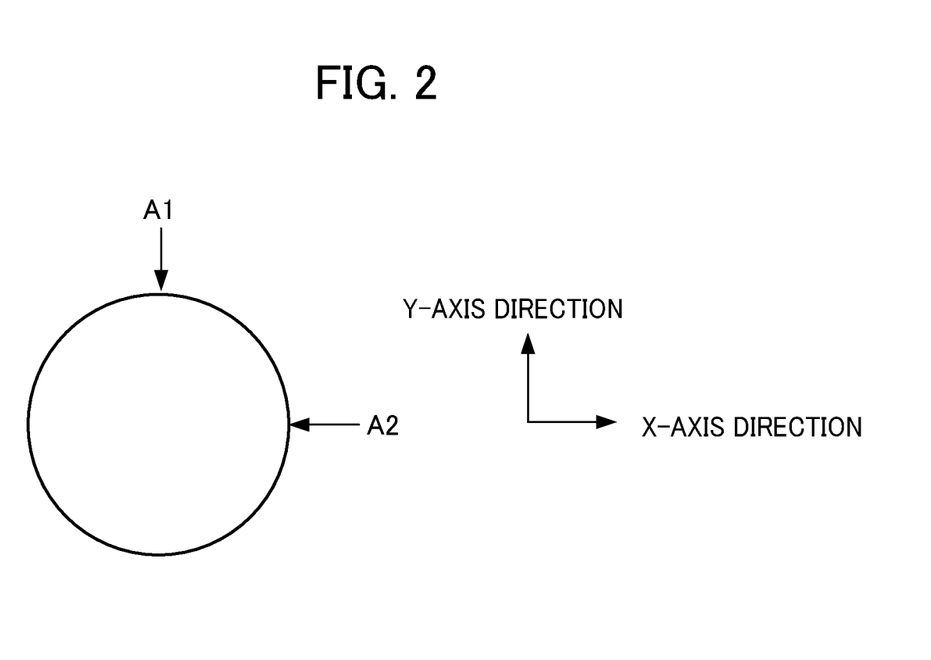
FIG. 2 is a diagram for describing an operation of a motor when a moving trajectory of a table is circular.

When the moving trajectory of the table 251 is circular as illustrated in FIG. 2, the rotation speed of the servo motor that moves the table in the Y-axis direction gradually decreases at the position A1 illustrated in FIG. 2 as it approaches the position A1 and gradually increases after passing through the position A1 with the rotation direction reversed at the position A1. The table then moves to be linearly reversed in the Y-axis direction with the position A1 interposed therebetween. On the other hand, the servo motor that moves the table in the X-axis direction at the position A1 rotates in the same velocity as the velocity before and after the position A1, and the table moves at the same velocity as the velocity before and after the position A1 in the X-axis direction. At the position A2 illustrated in FIG. 2, the respective servo motors are controlled so that the operation of the servo motor that moves the table in the X-axis direction and the operation of the servo motor that moves the table in the Y-axis direction are reversed.

Figure 3:
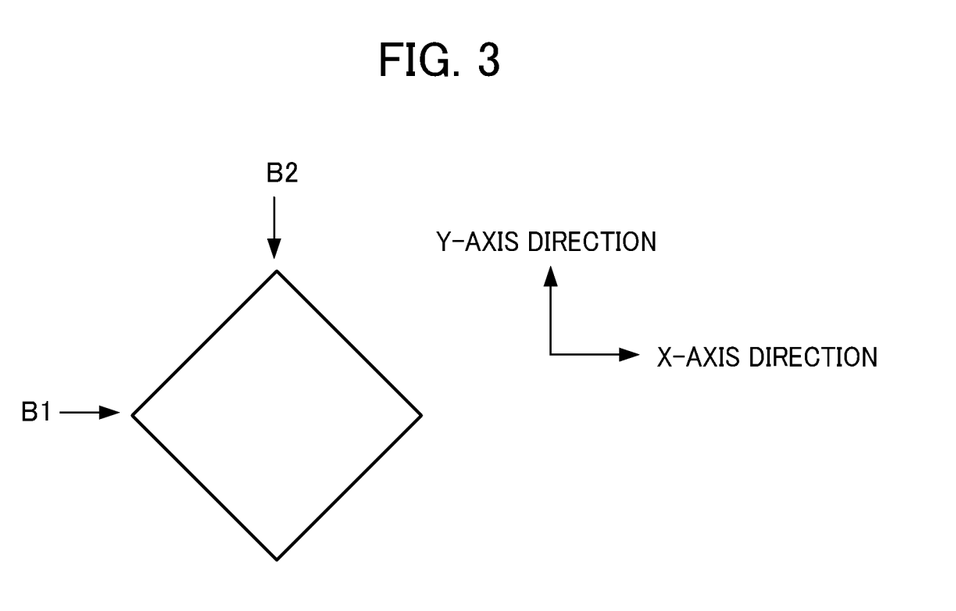
FIG. 3 is a diagram for describing an operation of a motor when a moving trajectory of a table is rectangular.

When the moving trajectory of the table 251 is rectangular as illustrated in FIG. 3, the rotation speed of the servo motor that moves the table in the X-axis direction is reversed abruptly at the position B1 illustrated in FIG. 3, and the table moves to be abruptly linearly reversed in the X-axis direction with the position B1 interposed therebetween. On the other hand, the servo motor that moves the table in the Y-axis direction at the position B1 rotates at the same velocity as the velocity before and after the position B1, and the table moves at the same velocity as the velocity before and after the position B1 in the Y-axis direction. At the position B2 illustrated in FIG. 3, the servo motors are controlled so that the operation of the servo motor that moves the table in the X-axis direction and the operation of the servo motor that moves the table in the Y-axis direction are reversed.

Figure 4:
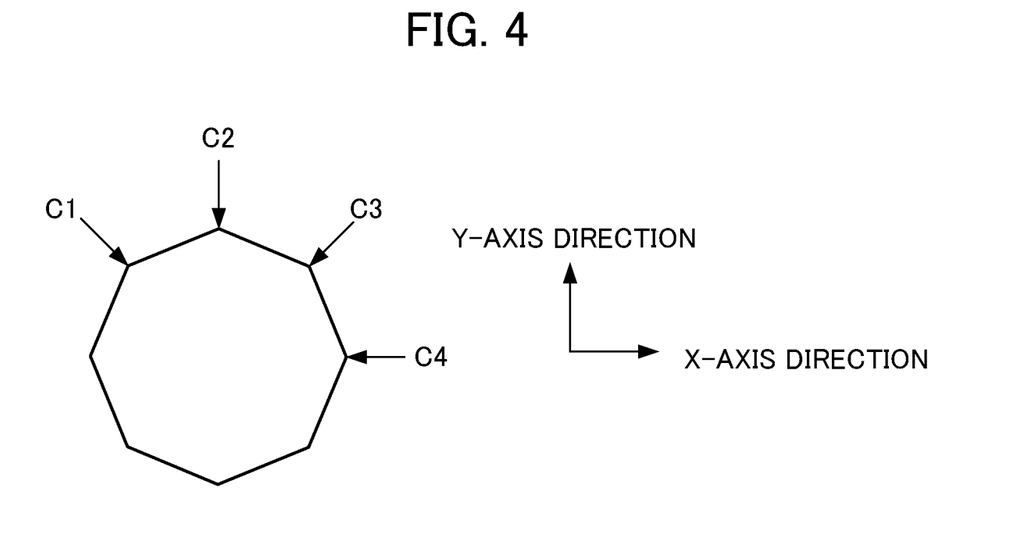
FIG. 4 is a diagram for describing an operation of a motor when a moving trajectory of a table is octagonal.

When the moving trajectory of the table 251 is octagonal as illustrated in FIG. 4, as illustrated in FIG. 4, the rotation speed of the motor that moves the table in the Y-axis direction decreases at the corner position C1, and the rotation speed of the motor that moves the table in the X-axis direction increases. At the corner position C2, the rotation direction of the motor that moves the table in the Y-axis direction is reversed, and the table moves to be linearly reversed in the Y-axis direction. Moreover, the motor that moves the table in the X-axis direction rotates at a constant velocity in the same rotation direction from the position C1 to the position C2 and from the position C2 to the position C3. At the corner position C3, the rotation speed of the motor that moves the table in the Y-axis direction increases, and the rotation speed of the motor that moves the table in the X-axis direction decreases. At the corner position C4, the rotation direction of the motor that moves the table in the X-axis direction is reversed, and the table moves to be linearly reversed in the X-axis direction. Moreover, the motor that moves the table in the Y-axis direction rotates at a constant velocity in the same rotation direction from the position C3 to the position C4 and from the position C1 to the next corner position.

Figure 5:
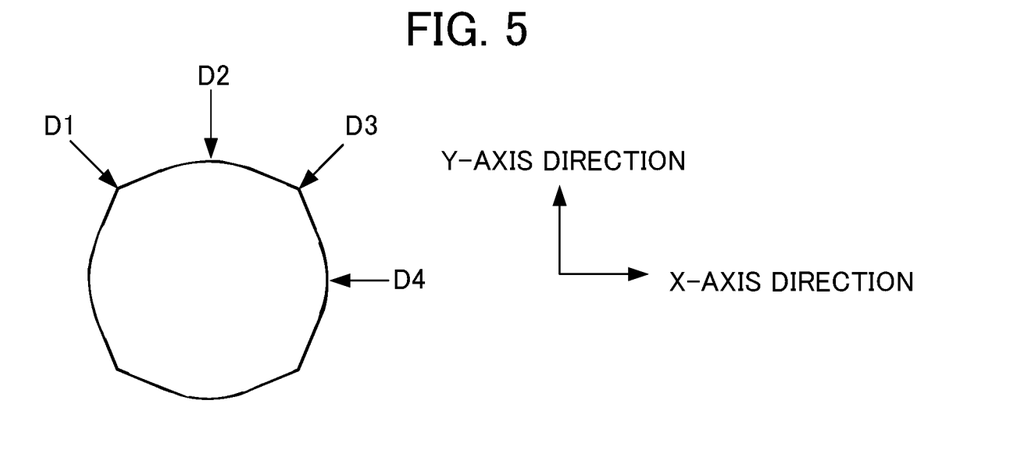
FIG. 5 is a diagram for describing an operation of a motor when a moving trajectory of a table is a shape in which the corners of an octagon are alternately replaced with arcs.

When the moving trajectory of the table 251 is a shape in which the corners of the octagon are alternately replaced with arcs, as illustrated in FIG. 5, at the corner position D1, the rotation speed of the motor that moves the table in the Y-axis direction decreases, and the rotation speed of the motor that moves the table in the X-axis direction increases. At the position D2 of the arc, the rotation direction of the motor that moves the table in the Y-axis direction is reversed, and the table moves to be linearly reversed in the Y-axis direction. Moreover, the motor that moves the table in the X-axis direction rotates at a constant velocity in the same rotation direction from the position D1 to the position D3. Unlike the case in which the moving trajectory illustrated in FIG. 4 is octagonal, the rotation speed of the motor that moves the table in the Y-axis direction gradually decreases as it advances toward the position D2 so that a moving trajectory of a circular arc is formed before and after the position D2 and the rotation speed gradually increases after passing through the position D2 with the rotation stopped at the position D2. At the corner position D3, the rotation speed of the motor that moves the table in the Y-axis direction increases, and the rotation speed of the motor that moves the table in the X-axis direction decreases. At the position D4 of a circular arc, the rotation direction of the motor that moves the table in the X-axis direction is reversed, and the table moves to be linearly reversed in the X-axis direction. Moreover, the motor that moves the table in the Y-axis direction rotates at a constant velocity in the same rotation direction from the position D3 to the position D4 and from the position D4 to the next corner position. The rotation speed of the motor that moves the table in the X-axis direction gradually decreases as it advances toward the position D4 so that a moving trajectory of a circular arc is formed before and after the position D4 and the rotation speed gradually increases after passing through the position D4 with the rotation stopped at the position D4.

In the present embodiment, vibration generated when the rotation direction of the X-axis direction or the Y-axis direction is reversed at the positions A1 and A2, the positions B1 and B2, the positions C2 and C4, and the positions D2 and D4 of the moving trajectory designated by the machining program during learning can be measured using the acceleration sensor 300. Moreover, vibration generated when the rotation speed is changed during linear control in which the rotation direction is not reversed at the positions C1 and C3 and the positions D1 and D3 can be measured using the acceleration sensor 300. As a result, it is possible to perform machine learning of the coefficients of the filter 110 so that vibration is suppressed.

Hereinafter, the machine learning unit 130 will be described in further detail. In the following description, although a case in which the machine learning unit 130 performs reinforcement learning is described, the learning performed by the machine learning unit 130 is not particularly limited to reinforcement learning, and the present invention can also be applied to a case in which the machine learning unit 130 performs supervised learning, for example.

Prior to a description of respective functional blocks included in the machine learning unit 130, first, a basic mechanism of reinforcement learning will be described. An agent (corresponding to the machine learning unit 130 in the present embodiment) observes an environment state and selects a certain action. Then, the environment changes on the basis of the action. A certain reward is given according to the environmental change, and the agent learns selections (decisions) for a better action. While supervised learning presents a complete correct answer, the reward in the reinforcement learning often presents a fragmental value based on a change in a portion of the environment. Therefore, the agent learns to select an action so that the total reward in the future is maximized.

In this way, the reinforcement learning learns a method of learning a suitable action on the basis of the mutual effect of an action on the environment (that is, an action for maximizing the reward to be obtained in the future) by learning an action. This represents that, in the present embodiment, such an action that affects the future, for example, an action of selecting action information for suppressing vibration of a machine end, is obtained.

Here, although any learning method may be used as the reinforcement learning, in the description below, Q-learning which is a method of learning a value function $Q(S,A)$ of selecting an action A under a certain state S of the environment will be described as an example. An object of Q-learning is to select an action A having the highest value function Q (S,A) as an optimal action among actions A that can be taken in a certain state S.

However, at an initial time point at which the Q-learning starts, the correct value of the value Q (S,A) is not known at all for a combination of the state S and the action A. Therefore, the agent learns the correct value Q(S,A) by selecting various actions A under a certain state S and making a better selection of actions based on rewards given for the selected actions A.

Since the agent wants to maximize the total reward obtained over the course of the future, the Q-learning aims to attain a relation of $Q(S,A)=E[\Sigma(\gamma^t)r_t]$ in the end. Here, E[ ] indicates an expected value, t indicates time, γ is a parameter called a discount factor to be described later, is a reward at time t, and Σ is the sum at time t. In this expression, the expected value is an expected value when the state was changed according to an optimal action. However, since it is unclear which action would be optimal in the process of Q-learning, reinforcement learning is performed while searching for an optimal action by performing various actions. An updating expression of such a value Q(S,A) can be represented by Expression 3 below (indicated as Math. 3 below).

$$Q(S_{t+1}, A_{t+1}) \leftarrow$$
$$Q(S_t, A_t) + \alpha\left(r_{t+1} + \gamma\max_{A} Q(S_{t+1}, A) - Q(S_t, A_t)\right)$$ [Math. 3]

In Expression 2, $S_t$ indicates a state of the environment at time t, and $A_t$ indicates an action at time t. By the action $A_t$, the state changes to $S_{t+1}$. $r_{t+1}$ indicates a reward obtained by the change in the state. Moreover, a term with max is a multiplication of the Q value by γ when an action A having the highest Q value known at that moment is selected under the state $S_{t+1}$. Here, γ is a parameter of 0<γ≤1 and is called a discount rate. Moreover, α is a learning coefficient and is in the range of 0<α≤1.

Expression 2 indicates a method of updating a value $Q(S_t,A_t)$ of an action $A_t$ in a state St based on a reward $r_{t+1}$ that was offered in return when the action At was performed. This updating expression indicates that if the value $\max_a Q(S_{t+1},A)$ of the best action in the next state $S_{t+1}$ associated with an action $A_t$ is larger than the value $Q(S_t,A_t)$ of an action $A_t$ in the state $S_t$, $Q(S_t,A_t)$ is increased, and if it is smaller, $Q(S_t,A_t)$ is decreased. That is, the updating expression brings the value of a certain action in a certain state close to the value of the best action in the next state associated with the action. However, although this difference differs depending on the discount rate γ and the reward $r_{t+1}$, the value of the best action in a certain state basically propagates to the value of an action in a state previous to that state.

Here, a Q-learning method of creating a value function Q(S,A) table for all state-action pairs (S,A) to perform learning is known. However, it may take a considerably long time for the Q-learning to converge, since the number of states is too large to calculate the Q(S,A) values of all state-action pairs.

Thus, Q-learning may use an existing technique called a deep Q-network (DQN). Specifically, with DQN, the value of the value Q(S,A) is calculated by constructing a value function Q using an appropriate neural network and approximating the value function Q with the appropriate neural network by adjusting the parameters of the neural network. By using DQN, it is possible to shorten the time required for convergence of Q-learning. The details of DQN are disclosed in the Non-Patent Document below, for example.

Non-Patent Document

"Human-level control through deep reinforcement learning", Volodymyr Mnihl [online], [accessed Jan. 17, 2017], Internet <URL: http://files.davidqiu.com/research/nature14236.pdf>

The machine learning unit 130 performs the above-described Q-learning. Specifically, the machine learning unit 130 learns a value Q of selecting an action A of adjusting the values of the coefficients ω, ζ, and R of the transfer function of the filter 110 associated with a state S, wherein the state S includes the values of the coefficients ω, ζ, and R of the transfer function of the filter 110, the measured acceleration from the acceleration sensor 300 acquired by executing the machining program during learning, and the position command.

The machine learning unit 130 observes the state information S including the measured acceleration from the acceleration sensor 300 and the position command by executing one or a plurality of machining program during learnings on the basis of the coefficients ω, ζ, and R of the transfer function of the filter 110 to determine the action A. The machine learning unit 130 receives a reward whenever the action A is executed. The machine learning unit 130 searches in a trial-and-error manner for the optimal action A so that the total of the reward over the course of the future is maximized. By doing so, the machine learning unit 130 can select an optimal action A (that is, the optical coefficients ω, ζ, and R of the transfer function of the filter 110) with respect to the state S including the measured acceleration from the acceleration sensor 300 acquired by executing the machining program during learning on the basis of the coefficients ω, ζ, and R of the transfer function of the filter 110 and the position command.

That is, the machine learning unit 130 can select such an action A (that is, the coefficients ω, ζ, and R of the transfer function of the filter 110) that minimizes the vibration of a machine end generated when a machining program during learning is executed by selecting such an action A that maximizes the value of Q among the actions A applied to the coefficients ω, ζ, and R of the transfer function of the filter 110 associated with a certain state S on the basis of the value function Q learned by the machine learning unit 130.

Figure 6:
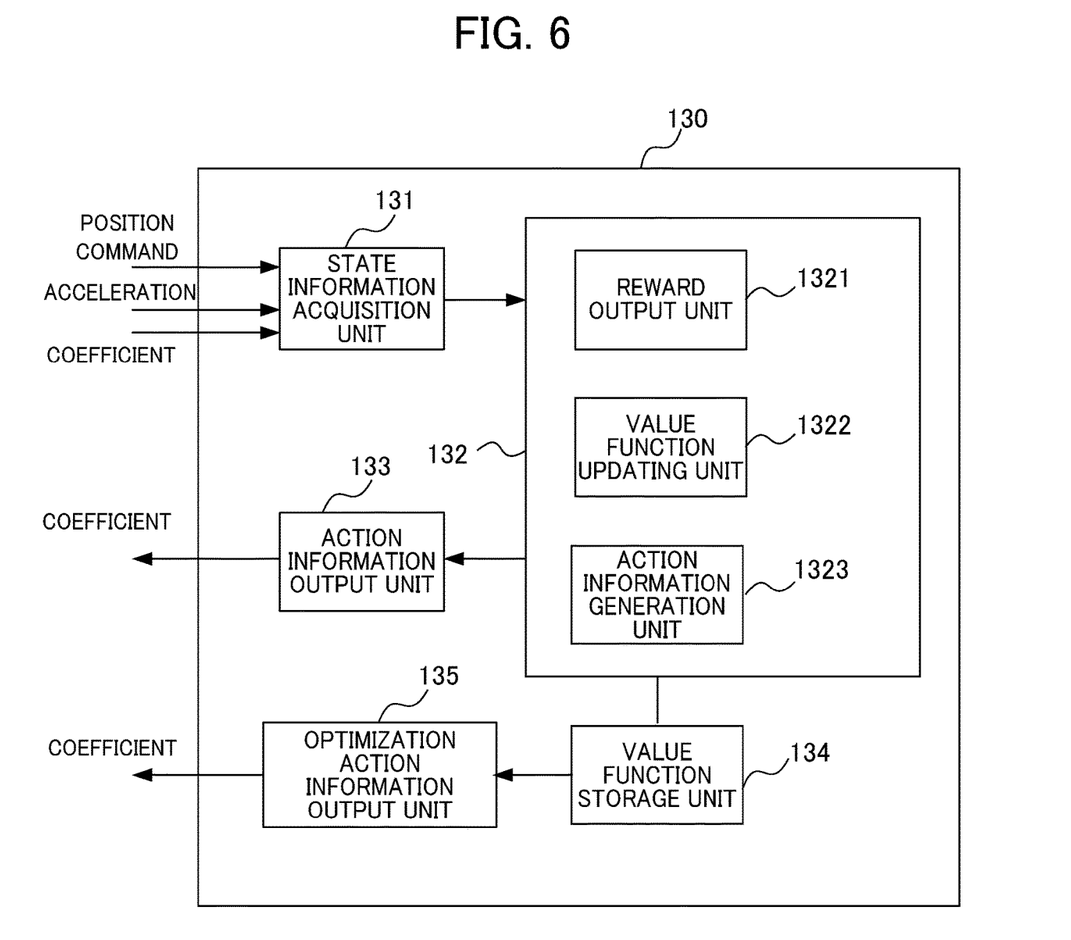
FIG. 6 is a block diagram illustrating a machine learning unit according to an embodiment of the present invention.

FIG. 6 is a block diagram illustrating the machine learning unit 130 according to an embodiment of the present invention. As illustrated in FIG. 6, in order to perform the reinforcement learning described above, the machine learning unit 130 includes a state information acquisition unit 131, a learning unit 132, an action information output unit 133, a value function storage unit 134, and an optimization action information output unit 135. The learning unit 132 includes a reward output unit 1321, a value function updating unit 1322, and as action information generation unit 1323.

The state information acquisition unit 131 acquires the state S including the position command and the measured acceleration from the acceleration sensor 300 acquired by executing the machining program during learning on the basis of the coefficients ω, ζ, and R of the transfer function of the filter 110. The state information S corresponds to a state S of the environment in the Q-learning. The state information acquisition unit 131 outputs the acquired state information S to the learning unit 132.

The coefficients ω, ζ, and R of the transfer function of the filter 110 at a time point at which the Q-learning starts initially are generated by a user in advance. In the present embodiment, the machine learning unit 130 adjusts the initial setting values of the coefficients ω, ζ, and R of the transfer function of the filter 110 created by the user to optimal values by the reinforcement learning. When a machine tool is adjusted by an operator in advance, the adjusted values of the coefficients ω, ζ, and R may be machine-learned as the initial values.

The learning unit 132 is a unit that learns the value Q(S,A) when a certain action A is selected under a certain environment state S.

The reward output unit 1321 is a unit that calculates a reward when the action A is selected under a certain state S. Here, a measured acceleration which is a state variable of the state S will be denoted by y(S), a position command which is a state variable associated with the state information S will be denoted by r(S), a measured acceleration which is a state variable associated with state information S' changed from the state S due to the action information A (corrections of the coefficients ω, ζ, and R of the transfer function of the filter 110) will be denoted by y(S'), and a position command which is a state variable associated with the state information S' will be denoted by r(S').

Expression 4 (indicated by Math. 4 below) can be used as the value function f, for example. Expression 4 indicates that the value function f is a time integration of a square of an absolute value of a difference between a double differentiation of the position command r and the measured acceleration y.

$$f(r, y) = \int \left| \frac{d^2 r}{dt^2} - y \right|^2 dt \qquad \text{[Math. 4]}$$

A time integration of an absolute value of an expression ($d^2r/dt^2-y$), a time integration of time (t)-weighted absolute value of the expression ($d^2r/dt^2-y$), and a largest value of a set of absolute values of the expression ($d^2r/dt^2-y$) may be used as the value function.

In this case, if a value function f(r(S'),y(S')) when the motor control device 100 was operated on the basis of the filter 110 after correction associated with the state information S' corrected by the action information A is larger than a value function f(r(S),y(S)) when the motor control device 100 was operated on the basis of the filter 110 before correction associated with the state information S before being corrected by the action information A, the reward output unit 1321 sets a reward value to a negative value.

On the other hand, if a value function f(r(S'),y(S')) when the motor control device 100 was operated on the basis of the filter 110 after correction associated with the state information S' corrected by the action information A is smaller than a value function f(r(S),y(S)) when the motor control device 100 was operated on the basis of the filter 110 before correction associated with the state information S before being corrected by the action information A, the reward output unit 1321 sets a reward value to a positive value. Moreover, if a value function f(r(S'),y(S')) when the motor control device 100 was operated on the basis of the filter 110 after correction associated with the state information S' corrected by the action information A is equal to a value function f(r(S),y(S)) when the motor control device 100 was operated on the basis of the filter 110 before correction associated with the state information S before being corrected by the action information A, the reward output unit 1321 sets a reward value to zero.

Furthermore, the negative value when the evaluation function f(r(S'),y(S')) of the state S' after execution of the action A is larger than the evaluation function f(r(S),y(S)) of the previous state S may increase according to a proportion. That is, the negative value may increase according to the degree of increase in the evaluation function f(r(S'),y(S')). In contrast, the positive value when the evaluation function f(r(S'),y(S')) of the state S' after execution of the action A is smaller than the evaluation function f(r(S),y(S)) of the previous state S may increase according to a proportion. That is, the positive value may increase according to the degree of decrease in the evaluation function f(r(S'),y(S')).

The value function updating unit 1322 updates the value function Q stored in the value function storage unit 134 by performing Q-learning on the basis of the state S, the action A, the state S' when the action A was applied to the state S, and the value of the reward calculated in this manner. The update of the value function Q may be performed by online learning, batch learning, or mini-batch learning. Online learning is a learning method of applying a certain action A to a present state S and updating the value function Q immediately whenever the present state S transitions to a new state S'. Batch learning is a learning method of applying a certain action A to a present state S and repeatedly attaining transition from the state S to a new state S', collecting learning data, and updating the value function Q using all the collected learning data. Mini-batch learning is a learning method which is intermediate between online learning and batch learning and involves updating the value function Q whenever a certain amount of learning data is collected.

The action information generation unit 1323 selects the action A in the process of Q-learning with respect to the present state S. The action information generation unit 1323 generates action information A and outputs the generated action information A to the action information output unit 133 in order to perform an operation (corresponding to the action A of Q-learning) of correcting the coefficients ω, ζ, and R of the transfer function of the filter 110 in the process of Q-learning. More specifically, the action information generation unit 1323 adds or subtracts the coefficients ω, ζ, and R of the transfer function of the filter 110 included in the action A incrementally with respect to the coefficients ω, ζ, and R of the transfer function of the filter 110 included in the state S, for example.

When the coefficients ω, ζ, and R of the transfer function of the filter 110 are increased or decreased, the state S transitions to the state S', and a plus reward (a positive reward) is offered in return, the action information generation unit 1323 may select a policy of selecting such an action A' that further decreases the value of the value function f such as incrementally increasing or decreasing the coefficients ω, ζ, and R of the transfer function of the filter 110 similarly to the previous action as the next action A'.

In contrast, when a minus reward (a negative reward) is offered in return, the action information generation unit 1323 may select a policy of selecting such an action A' that decreases the value function f to be smaller than the previous value such as incrementally decreasing or increasing the coefficients ω, ζ, and R of the transfer function of the filter 110 contrarily to the previous action as the next action A', for example.

The action information generation unit 3023 may select a policy of selecting the action A' according to a known method such as a greedy method of selecting an action A' having the highest value function Q(S,A) among the values of presently estimated actions A and an ε-greedy method of randomly selecting an action A' with a certain small probability ε and selecting an action A' having the highest value function Q (S,A) in other cases.

The action information output unit 133 is a unit that the action information A output from the learning unit 132 to the filter 110. As described above, the filter 110 finely adjusts the present state S (that is, the coefficients ω, ζ, and R set presently) on the basis of the action information to thereby transition to the next state S' (that is, the corrected coefficients of the filter 110).

The value function storage unit 134 is a storage device that stores the value function Q. The value function Q may be stored as a table (hereinafter referred to as an action value table) for each state S and each action A, for example. The value function Q stored in the value function storage unit 134 is updated by the value function updating unit 1322. Moreover, the value function Q stored in the value function storage unit 134 may be shared with other machine learning units 130. When the value function Q is shared by a plurality of machine learning units 130, since reinforcement learning can be performed in a manner of being distributed to the respective machine learning units 130, it is possible to improve the efficiency of reinforcement learning.

The optimization action information output unit 135 generates the action information A (hereinafter referred to as "optimization action information") for causing the filter 110 to perform an operation of maximizing the value function Q(S,A) on the basis of the value function Q updated by the value function updating unit 1322 performing the Q-learning. More specifically, the optimization action information output unit 135 acquires the value function Q stored in the value function storage unit 134. As described above, the value function Q is updated by the value function updating unit 1322 performing the Q-learning. The optimization action information output unit 135 generates the action information on the basis of the value function Q and outputs the generated action information to the filter 110. The optimization action information includes information that corrects the coefficients ω, ζ, and R of the transfer function of the filter 110 similarly to the action information that the action information output unit 133 outputs in the process of Q-learning.

In the filter 110, the coefficients ω, ζ, and R of the transfer function are corrected on the basis of the action information. With the above-described operations, the machine learning unit 130 can optimize the coefficients ω, ζ, and R of the transfer function of the filter 110 and operate so that vibration of a machine end is suppressed. As described above, it is possible to simplify the adjustment of the parameters of the filter 110 using the machine learning unit 130.

Hereinabove, the functional blocks included in the motor control device 100 have been described. In order to realize these functional blocks, the motor control device 100 includes an arithmetic processing unit such as a central processing unit (CPU). The motor control device 100 further includes an auxiliary storage device such as a hard disk drive (HDD) for storing various control programs such as application software or an operating system (OS) and a main storage device such as a random access memory (RAM) for storing data temporarily required when the arithmetic processing device executes a program.

In the motor control device 100, the arithmetic processing device reads an application or an OS from the auxiliary storage device and develops the read application software or OS in the main storage device to perform arithmetic processing on the basis of the read application software or OS. The arithmetic processing device also controls various types of hardware provided in each device based on the arithmetic result. In this way, the functional blocks of the present embodiment are realized. That is, the present embodiment can be realized by the cooperation of hardware and software.

Since the machine learning unit 130 involves a large amount of computation associated with the machine learning, graphics processing units (GPUs) may be mounted on a personal computer and be used for arithmetic processing associated with the machine learning using a technique called general-purpose computing on graphics processing units (GPGPUs). In this way, high-speed processing can be performed. Furthermore, in order for the machine learning unit 130 to perform higher-speed processing, a computer cluster may be built using a plurality of computers equipped with such GPUs, and the plurality of computers included in the computer cluster may perform parallel processing.

Figure 7:
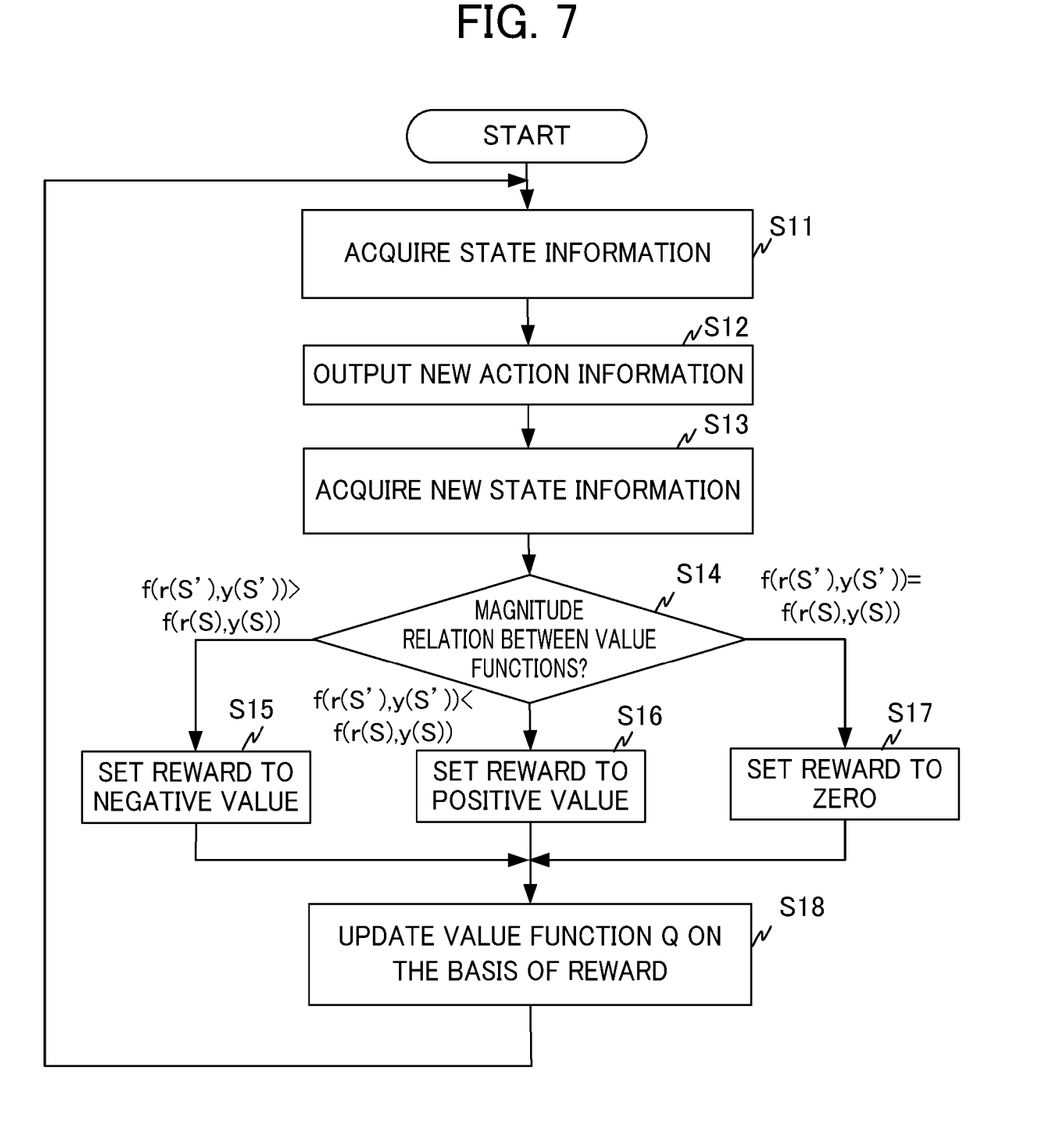
FIG. 7 is a flowchart for describing an operation of a machine learning unit according to an embodiment of the present invention.

Next, an operation of the machine learning unit 130 during Q-learning according to the present embodiment will be described with reference to the flowcharts in FIG. 7.

In step S11, the state information acquisition unit 131 acquires the state information S from the motor control device 100. The acquired state information S is output to the value function updating unit 1322 and the action information generation unit 1323. As described above, the state information S is information corresponding to the state of Q-learning and includes the coefficients ω, ζ, and R of the transfer function of the filter 110 at the time point of step S11. In this way, a position command r(S) and a measured acceleration y(S) corresponding to a predetermined feed rate and the shape of a moving trajectory when the coefficients of the transfer function of the filter 110 are initial values are acquired.

The position command $r(S_0)$ in the state $S_0$ at a time point at which Q-learning starts initially and the measured acceleration $y(S_0)$ from the acceleration sensor 300 are obtained by operating the motor control device 100 according to the machining program during learning. The position command input to the motor control device 100 is a position command corresponding to a predetermined moving trajectory designated by the machining program (for example, the octagonal moving trajectory illustrated in FIGS. 4 and 5). The position command is input to the filter 110 and the machine learning unit 130. The initial values of the coefficients ω, ζ, and R of the transfer function of the filter 110 are generated by a user in advance, and the initial values of the coefficients ω, ζ, and R are transmitted to the machine learning unit 130. The acceleration sensor 300 outputs the measured acceleration y $(S_0)$ at the respective positions such as the positions C1 to C4 and the positions D1 to D4 of the moving trajectory to the machine learning unit 130. The machine learning unit 130 may extract the position command $r(S_0)$ and the measured acceleration $y(S_0)$ at the respective positions such as the positions C1 to C4 and the positions D1 to D4 of the moving trajectory.

In step S12, the action information generation unit 1323 generates new action information A and outputs the generated new action information A to the filter 110 via the action information output unit 133. The action information generation unit 1323 outputs the new action information A on the basis of the above-described policy. The motor control device 100 having received the action information A drives a machine tool including the servo motor 127 according to the state S' obtained by correcting the coefficients ω, ζ, and R of the transfer function of the filter 110 associated with the present state S on the basis of the received action information. As described above, the action information corresponds to the action A in Q-learning.

In step S13, the state information acquisition unit 131 acquires the measured acceleration y(S') from the acceleration sensor 300 and the coefficients ω, ζ, and R of the transfer function from the filter 110 in the new state S'. In this way, the state information acquisition unit 131 acquires the position command r(S') and the measured acceleration y(S') corresponding to the octagonal moving trajectory (specifically, the positions such as the positions C1 to C4 and the positions D1 to D4 of the moving trajectory) and the coefficients ω, ζ, and R in the state S' from the filter 110. The acquired state information is output to the reward output unit 1321.

In step S14, the reward output unit 1321 determines a magnitude relation between the evaluation function f(r(S'), y(S')) in the state S' and the evaluation function f(r(S),y(S)) in the state S and sets the reward to a negative value in step S15 when f(r(S'),y(S'))>f(r(S),y(S)). When f(r(S'),y(S'))<f(r(S),y(S)), the reward output unit 1321 sets the reward to a positive value in step S16. When f(r(S'),y(S'))=f(r(S),y(S)), the reward output unit 1321 sets the reward to zero in step S17. The reward output unit 1321 may apply a weighting to the negative and positive reward values. The state S transitions to the state $S_0$ at a time point at which Q-learning starts.

When any one of steps S15, S16, and S17 end, the value function updating unit 1322 updates, in step S18, the value function Q stored in the value function storage unit 134 on the basis of the value of the reward calculated in any one of those steps. After that, the flow returns to step S11 again, and the above-described process is repeated, whereby the value function Q settles to an appropriate value. The process may end on a condition that the above-described process is repeated for a predetermined period. Although online updating is exemplified in step S18, batch updating or mini-batch updating may be performed instead of the online updating.

In the present embodiment, due to the operations described with reference to FIG. 7, it is possible to obtain an appropriate value function for adjustment of the coefficients ω, ζ, and R of the transfer function of the filter 110 and to simplify optimization of the coefficients ω, ζ, and R of the transfer function of the filter 110 using the machine learning unit 130. Next, an operation during the generation of the optimization action information by the optimization action information output unit 135 will be described with reference to the flowchart in FIG. 8. First, in step S21, the optimization action information output unit 135 acquires the value function Q stored in the value function storage unit 134. As described above, the value function Q is updated by the value function updating unit 1322 performing the Q-learning.

Figure 8:
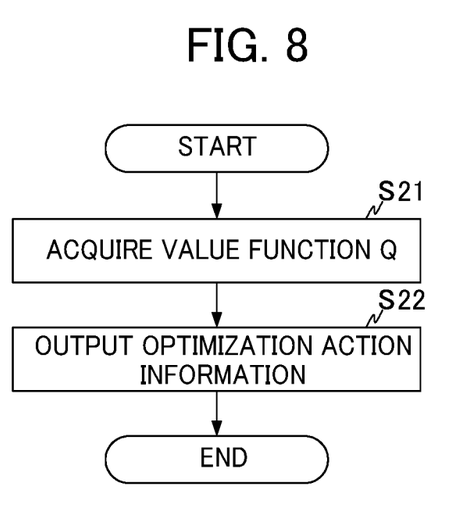
FIG. 8 is a flowchart for describing an operation of an optimization action information output unit of the machine learning unit according to an embodiment of the present invention.

In step S22, the optimization action information output unit 135 generates the optimization action information on the basis of the value function Q and outputs the generated optimization action information to the filter 110.

In the present embodiment, due to the operations described with reference to FIG. 8, it is possible to generate the optimization action information on the basis of the value function Q obtained by the learning of the machine learning unit 130, simplify the adjustment of the coefficients ω, ζ, and R of the transfer function of the filter 110 set presently on the basis of the optimization action information, suppress vibration of a machine end, and improve the quality of a machining surface of a work. Since the external measuring instrument is disposed outside the motor control device, it is possible to remove the external measuring instrument after machine learning is performed, reducing costs and improving reliability.

The servo control unit of the motor control device described above and the components included in the machine learning unit may be realized by hardware, software, or a combination thereof. The servo control method performed by the cooperation of the components included in the motor control device described above also may be realized by hardware, software, or a combination thereof. Here, being realized by software means being realized when a computer reads and executes a program.

The programs can be stored on any of the various types of non-transitory computer-readable media and be provided to a computer. The non-transitory computer-readable media include various types of tangible storage media. Examples of the non-transitory computer-readable media include a magnetic recording medium (for example, a flexible disk, a magnetic tape, and a hard disk drive), a magneto-optical recording medium (for example, a magneto-optical disk), a CD-ROM (Read Only Memory), a CD-R, a CD-R/W, a semiconductor memory (for example, a mask ROM, a PROM (Programmable ROM), an EPROM (Erasable PROM), a flash ROM, and a RAM (Random Access Memory)). Moreover, the programs may be supplied to a computer via various types of transitory computer-readable media.

The above-described embodiment is a preferred embodiment of the present invention. However, the scope of the present invention is not limited to this embodiment only, and the present invention can be embodied in various modifications without departing from the spirit of the present invention.

In the above-described embodiment, a case in which an acceleration sensor is used as an external measuring instrument and the measurement information is acceleration information has been described. However, a position sensor or a velocity sensor may be used as the external measuring instrument to obtain position information and velocity information which may be differentiated or double-differentiated to obtain acceleration information.

Moreover, although the value function f is a function which uses a difference (that is, an acceleration error) between a measured acceleration y and a value $d^2r/dt^2$ obtained by double-differentiating the position command, a function which uses a position error or a velocity error may be used. Specifically, when a position error is used as a value function, the machine learning unit 130 may acquire a position command and a measured position from a position sensor as an external measuring instrument as the state information and may use, as the value function, a time integration of an absolute value of a difference between the position command and the measured position, a time integration of a square of an absolute value of a position error, a time integration of a time (t)-weighted absolute value of the position error, and a largest value of a set of absolute values of the position error.

Moreover, when a velocity error is used as a value function, the machine learning unit 130 may acquire a position command and a measured position from a velocity sensor as an external measuring instrument as the state information and may use, as the value function, a time integration of an absolute value of a difference (a velocity error) between a measured velocity and a value obtained by differentiating the position command, a time integration of a square of an absolute value or a velocity error, a time integration or a time (t)-weighted absolute value of the velocity error, and a largest value of a set of absolute values of the velocity error.

An example of a value function which uses a position error a velocity error, and an acceleration error is a time integration of $[c_a \times (\text{position error})^2 + c_b \times (\text{velocity error})^2 c_c \times (\text{acceleration error})^2]$, for example. The coefficients $c_a$, $c_b$, $c_c$ are weighting coefficients.

Figure 9:
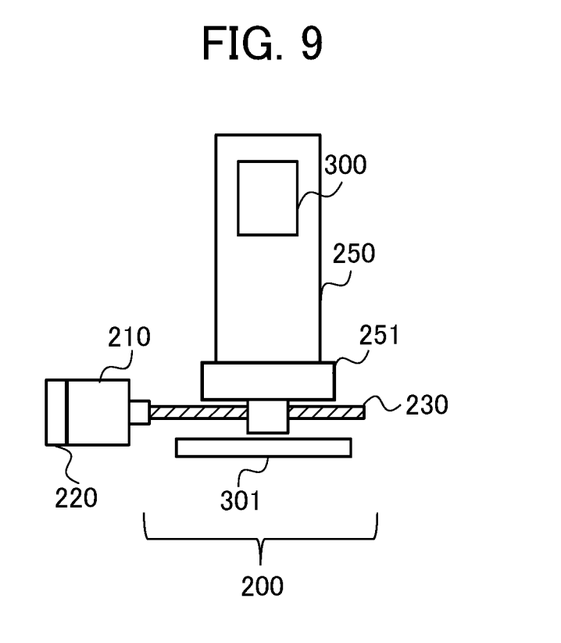
FIG. 9 is an explanatory diagram illustrating a state in which a scale is attached to a table of a machine body.
Figure 10:
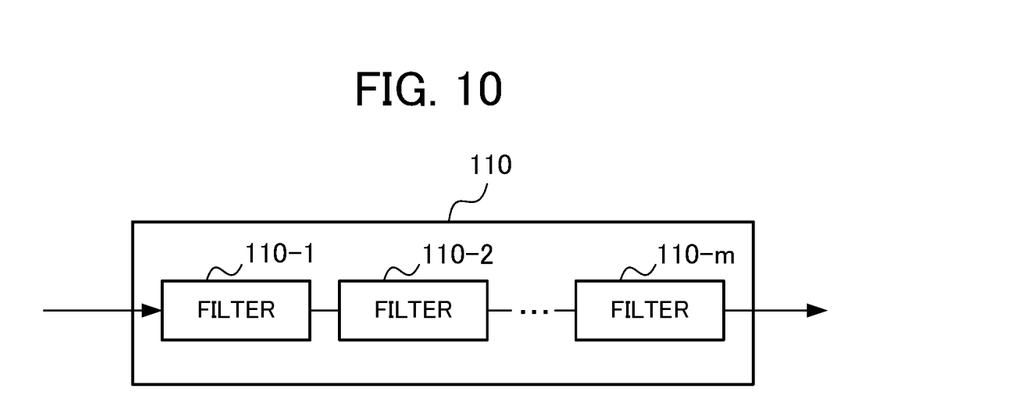
FIG. 10 is a block diagram illustrating an example in which a filter is formed by connecting a plurality of filters directly.

When a position sensor is used as an external measuring instrument, a scale (a linear scale) is attached to a table as an external measuring instrument. FIG. 9 is an explanatory diagram illustrating a state in which a scale is attached to the table 251 of the machine body 250. In this case, a scale 301 detects the position of the table 251 and outputs position information to the machine learning unit 130. In the above-described embodiment, although a case in which the machine tool 200 has one resonance point has been described, the machine tool 200 may have a plurality of resonance points. When the machine tool 200 has a plurality of resonance points, a plurality of filters may be provided so as to correspond to the respective resonance points and be connected in series whereby all resonances can be attenuated. FIG. 10 is a block diagram illustrating an example in which a plurality of filters are connected in series to form a filter. In FIG. 10, when there are m (m is a natural number of 2 or more) resonance points, the filter 110 is formed by connecting m filters 110-1 to 110-m in series. Optimal values for attenuating resonance are calculated sequentially by machine learning with respect to the coefficients ω, ζ, and R of the m filters 110-1 to 110-m.

In the servo control unit 120 of the motor control device 100 illustrated in FIG. 1, although an example in which the position feedforward unit 124 is only provided as a feedforward control unit is illustrated, another velocity feedforward unit may be provided in addition to the position feedforward unit 124. An adder is provided on the output side of the velocity control unit 126 illustrated in FIG. 1, and a velocity feedforward unit is provided between the input side of the adder and the output side of the filter 110. The adder adds the output of the velocity control unit 126 and the output of the velocity feedforward unit and outputs an addition result to the servo motor 127. The velocity feedforward unit performs a velocity feedforward process represented by a transfer function H(s) indicated by Expression 5 (indicated by Math. 5 below) with respect to a value obtained by double-differentiating a position command value and multiplying the same by a constant β and outputs the processing result to the adder as a velocity feedforward term. The coefficients $c_i$ and $d_j$ (X≥1, j≥0, and X is a natural number) in Expression 5 are the coefficients of the transfer function H(s). The natural number X may be the same number as or a different number from the natural number X in Expression 2.

$$H(s) = \frac{d_0 + d_1 s + d_2 s^2 + \ldots + d_x s^x}{c_0 + c_1 s + c_2 s^2 + \ldots + c_x s^x} \quad [\text{Math. 5}]$$

The control system may have the following configuration other than the configuration illustrated in FIG. 1.
<Modification in which Machine Learning Device is Provided Outside Motor Control Device>

Figure 11:
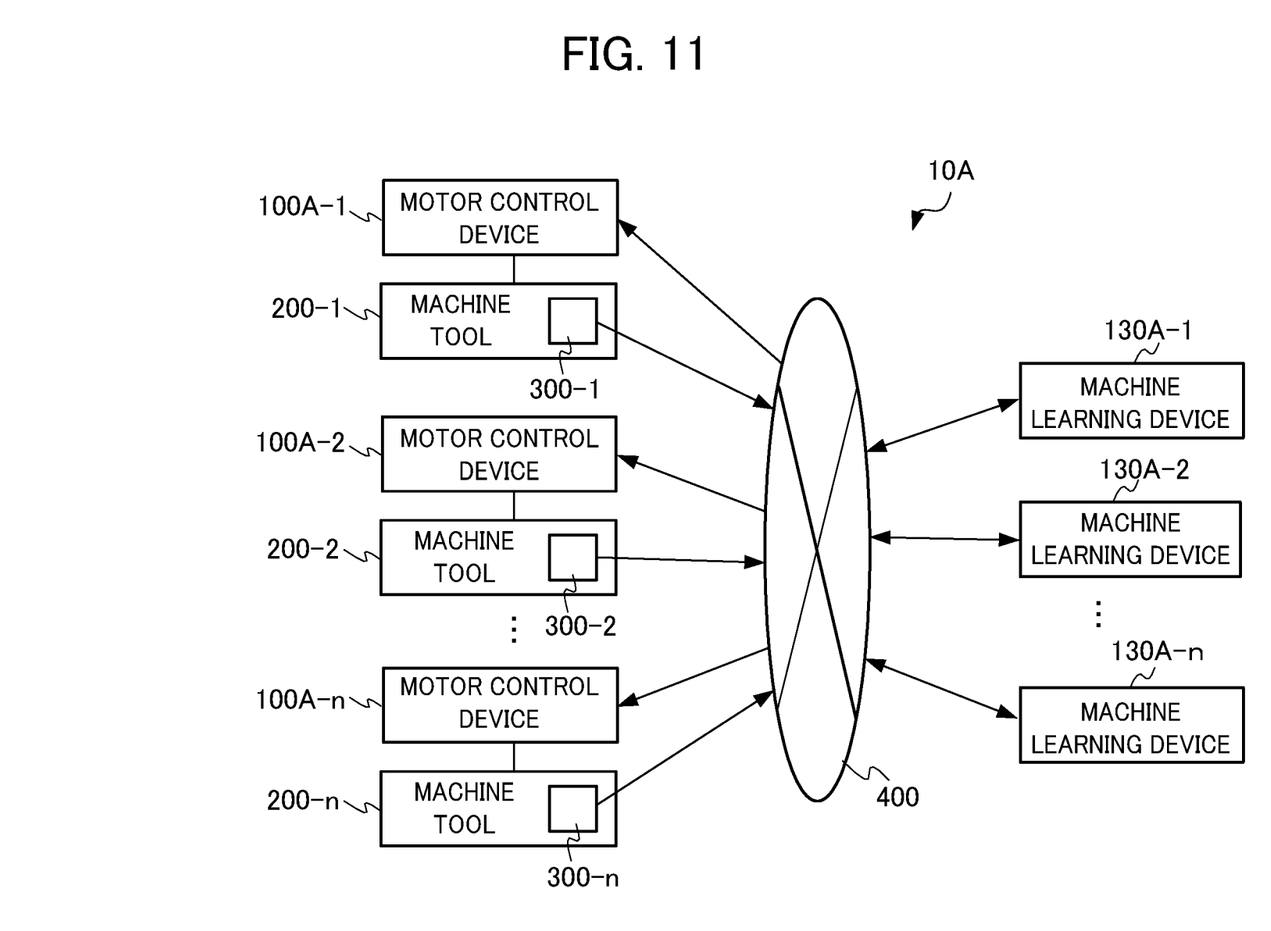
FIG. 11 is a block diagram illustrating another configuration example of a control system.

FIG. 11 is a block diagram illustrating another configuration example of the control system. A difference between a control system 10A illustrated in FIG. 11 and the control system 10 illustrated in FIG. 1 is that n (n is a natural number of 2 or more) motor control devices 100A-1 to 100A-n and n machine tools 200-1 to 200-n having acceleration sensors 300-1 to 300-n attached thereto are connected to machine learning devices 130A-1 to 130A-n via a network 400. The motor control devices 100A-1 to 100A-n have the same configuration as the motor control device 10 illustrated in FIG. 1 except that the motor control device does not include a machine learning unit. The machine learning devices 130A-1 to 130A-n have the same configuration as the machine learning unit 130 illustrated in FIG. 6.

Here, the motor control device 100A-1, the acceleration sensor 300-1, and the machine learning device 130A-1 are communicably connected as a one-to-one pair. The motor control devices 100A-2 to 100A-n, the acceleration sensors 300-2 to 300-n, and the machine learning devices 130A-2 to 130A-n are connected similarly to the motor control device 100A-1, the machine tool 200-1, and the machine learning device 130A-1. Although n pairs of the motor control devices 100A-1 to 100A-n, the acceleration sensors 300-1 to 300-n, and the machine learning devices 130A-1 to 130A-n are connected via the network 400 in FIG. 11, the n pairs of the motor control devices 100A-1 to 100A-n, the acceleration sensors 300-1 to 300-n, and the machine learning devices 130A-1 to 130A-n may be connected directly such that the motor control device, the machine tool, and the machine learning device of each pair are connected directly by a connection interface. A plurality of n pairs of the motor control devices 100A-1 to 100A-n, machine tools 200-1 to 200-n having acceleration sensors 300-1 to 300-n attached thereto, and machine learning devices 130A-1 to 130A-n may be provided in the same plant, for example, and may also be provided in different plants.

The network 400 is a local area network (LAN) constructed in a plant, the Internet, a public telephone network, a direct connection via a connection interface, or a combination thereof, for example. The specific communication scheme of the network 400, whether the network uses a cable connection or a wireless connection, and the like are not particularly limited.
<Freedom in System Configuration>

In the embodiment described above, the motor control devices 100A-1 to 100A-n, the acceleration sensors 300-1 to 300-n, and the machine learning devices 130A-1 to 130A-n are communicably connected as one-to-one pairs. However, for example, one machine learning device may be communicably connected to a plurality of motor control devices and a plurality of acceleration sensors via the network 400, and the machine learning of the respective motor control devices and the respective machine tools may be performed. In this case, a distributed processing system may be adopted, in which respective functions of one machine learning device are distributed to a plurality of servers as appropriate. The functions of one machine learning device may be realized by utilizing a virtual server function or the like in the cloud.

When there are n machine learning devices 130A-1 to 130A-n corresponding to n motor control devices 100A-1 to 100A-n and n machine tools 200-1 to 200-n, respectively, of the same type name, the same specification, or the same series, the machine learning devices 130A-1 to 130A-n may be configured to share the learning results of the machine learning devices 130A-1 to 130A-n. By doing so, a more optimal model can be constructed.

EXPLANATION OF REFERENCE NUMERALS 10, 10A: Control system
100, 100A-1 to 100A-n: Motor control device
110: Filter
120: Servo control unit
121: Subtractor
122: Position control unit
123: Adder
124: Position feedforward unit
125: Subtractor
126: Velocity control unit
127: Servo motor
128: Rotary encoder
129: Integrator
130: Machine learning unit
130A-1 to 130A-n: Machine learning device
131: State information acquisition unit
132: Learning unit
133: Action information output unit
134: Value function storage unit
135: Optimization action information output unit
200, 200-1 to 200-n: Machine tool
300: Acceleration sensor
400: Network

What is claimed is:

1. A machine learning device that performs machine learning of optimizing coefficients of a filter provided outside a servo control unit and provided in a motor control device that controls the rotation of a motor on the basis of measurement information of an external measuring instrument provided outside the motor control device and a control command input to the motor control device, the machine learning device comprising:
a state information acquisition unit that acquires state information including the measurement information, the control command, and the coefficients of the filter;
an action information output unit that outputs action information including adjustment information of the coefficients included in the state information to the filter;
a reward output unit that outputs a reward value for reinforcement learning using a value function based on a difference between the measurement information and the control command; and
a value function updating unit that updates an action value function on the basis of the reward value output by the reward output unit, the state information, and the action information.

2. The machine learning device according to claim 1, wherein
the measurement information of the external measuring instrument includes at least one of a position, a velocity, and an acceleration.

3. The machine learning device according to claim 1, wherein
the motor control device includes at least one of a position feedback loop and a velocity feedback loop, and the filter is provided outside the position feedback loop or the velocity feedback loop.

4. The machine learning device according to claim 1, wherein
the motor control device has a feedback loop, and the measurement information of the external measuring instrument is not used for feedback control of the feedback loop.

5. The machine learning device according to claim 1, wherein
the external measuring instrument is detached after adjustment of the filter by machine learning.

6. The machine learning device according to claim 1, further comprising:
an optimization action information output unit that outputs adjustment information of the coefficients on the basis of the value function updated by the value function updating unit.

7. A control system comprising:
a motor control device that includes the machine learning device according to claim 1, a motor, and a filter and controls the rotation of the motor; and
an external measuring instrument provided outside the motor control device.

8. A machine learning method of a machine learning device that performs machine learning of optimizing coefficients of a filter provided outside a servo control unit and provided in a motor control device that controls the rotation of a motor on the basis of measurement information of an external measuring instrument provided outside the motor control device and a control command input to the motor control device, the machine learning method comprising:
acquiring state information including the measurement information, the control command, and the coefficients of the filter;
outputting action information including adjustment information of the coefficients included in the state information to the filter;
outputting a reward value for reinforcement learning using a value function based on a difference between the measurement information and the control command; and
updating an action value function on the basis of the reward value, the state information, and the action information.

* * * * *